United States Patent [19]

Hermann et al.

[11] Patent Number: 4,885,803

[45] Date of Patent: Dec. 5, 1989

[54] SYSTEM AND METHOD FOR CONTROLLING A PLURALITY OF ELECTRONIC ENTERTAINMENT DEVICES

[75] Inventors: Lawrence W. Hermann, 1922 Old Orchard, Dallas, Tex. 75208; Donald G. Offield, Addison, Tex.

[73] Assignee: Lawrence W. Hermann, Dallas, Tex.

[21] Appl. No.: 26,460

[22] Filed: Mar. 17, 1987

[51] Int. Cl.⁴ ............................................... H04B 9/00
[52] U.S. Cl. ..................................... 455/603; 455/600; 455/4; 340/825.72
[58] Field of Search .................... 455/600, 603, 3, 4, 455/5; 340/825.72, 825.71, 825.24, 825.71

[56] References Cited

U.S. PATENT DOCUMENTS

| | | | |
|---|---|---|---|
| 3,423,521 | 1/1969 | Friesen et al. | 178/5.6 |
| 3,699,250 | 10/1972 | Bunting | 340/310 |
| 4,337,480 | 6/1982 | Bourassin et al. | 455/603 |
| 4,439,784 | 3/1984 | Furukawa et al. | 455/4 |
| 4,509,211 | 4/1985 | Robbins | 455/603 |
| 4,656,655 | 4/1987 | Hashimoto | 379/105 |

OTHER PUBLICATIONS

Gfeller et al; "Wireless In-House Data Communications via Diffuse Infrared Radiation;"*Proceedings of the I.E.E.E.;* vol. 67; No. 11; Nov. 1979; pp. 1474–1486.

Primary Examiner—Robert L. Griffin
Assistant Examiner—Andrew J. Telese, Jr
Attorney, Agent, or Firm—W. Kirk McCord

[57] ABSTRACT

A system and method for controlling and distributing the entertainment signals from a plurality of electronic entertainment devices to a plurality of remote locations within a building; A host controller combines the respective entertainment signals from a plurality of sources, such as a satellite receiver unit, a video cassette recorder and a rooftop antenna, to provide a mixed output signal at a relatively constant impedance. The mixed output signal is transmitted along a single coaxial cable to a plurality of remote locations distributed along the cable. Each remote location includes an infrared detector for receiving infrared control signals from a remote control transmitter for controlling the corresponding entertainment device. The infrared detector converts the infrared control signals into corresponding electrical control signals and transmits the electrical control signals back to the host controller on a second conductor which is also included within the coaxial cable. The host controller reconverts the electrical control signals to infrared signals for operating the respective entertainment devices. The infrared detectors at each remote location are powered directly from the host controller, thereby eliminating the need for wall transformers and the like.

7 Claims, 4 Drawing Sheets

SYSTEM AND METHOD FOR CONTROLLING A PLURALITY OF ELECTRONIC ENTERTAINMENT DEVICES

FIELD OF THE INVENTION

The present invention relates generally to electronic entertainment devices and in particular to a system and method for controlling a plurality of electronic entertainment devices at multiple locations.

BACKGROUND OF THE INVENTION

Electronic entertainment devices, such as television sets and the like, often include dedicated remote control units for operating the particular entertainment devices. Such remote control units are usually comprised of a handheld remote control transmitter and a receiver mounted within the particular entertainment device for detecting and decoding the control signals from the transmitter. Such signals may be electromagnetic (infrared or radio frequencies) or ultrasonic in nature.

Remote control units which utilize an infrared link are generally dependent upon a line of sight path between the infrared transmitter and receiver. In many instances an extension of the operational range of the remote control unit is desirable. For example, a satellite receiver system may include an infrared receiver for operating the unit in accordance with the incoming signals received from the remote control transmitter. If a user is watching television in one part of the house and desires to operate the satellite receiver unit in a different part of the house, he may be out of range of the unit and would have to walk to a different part of the house in order to operate the unit. To alleviate this problem, each television monitor could, of course, be provided with its own selector unit, but this is expensive and not a practical option.

DESCRIPTION OF THE PRIOR ART

The prior art is replete with remote control systems for controlling a plurality of electronic devices. Such control systems typically include a remote control transmitter and receiver and a central controller for selectively operating a plurality of electronic devices in accordance with the control signals generated by the user via the remote control transmitter. In U.S. Pat. No. 4,509,211 an infrared extension system is described, whereby the operational range of an infrared link in a communication or data transmission system is extended beyond line of sight range. An infrared detector is located at a remote station for detecting the infrared signals from a user-operated transmitter and a main infrared emitter is located within range of a main infrared receiver on a satellite receiver unit or the like. A transmission line links the remote infrared detector with the main emitter for transmitting the control signals electrically to the main emitter. The main emitter in turn coverts an electrical signal to an infrared signal, which is detected by the main infrared receiver in the electronic unit being controlled.

Although the infrared extension system described above provides remote control of an electronic device beyond the conventional infrared range, the system has several disadvantages and limitations. For example, a frequency splitter must be used in connection with each remote receiver when a single transmission line is used, which not only complicates but also adds to the expense of the system. Furthermore, the remote detector unit is electrically isolated from the main emitter unit by virtue of the corresponding frequency splitters, so that each remote detector unit requires its own power supply converter to provide the requisite DC power. Nor is there any teaching or suggestion in the aforementioned patent of how entertainment signals from multiple sources, such as a satellite receiver, roof top antenna, or video tape recorder could be transmitted to the remote locations via a single transmission line or how the control signals from more than one remote location could be transmitted via the single transmission line.

Other types of remote control systems for electronic devices are described in U.S. Pat. Nos. 3,924,120; 4,229,765; 4,337,480; 4,367,548; 4,386,436; 4,394,691; 4,420,841; 4,488,179; and 4,596,049 and in Japanese Pat. Nos. 133,153 and 66,156 and German Pat. No. DE 3244-712.

OBJECTS OF THE INVENTION

It is, therefore, the principal object of the present invention to provide an improved system and method for controlling a plurality of electronic entertainment devices.

Another object of the invention is to provide a cost effective system for controlling and distributing entertainment signals from a plurality of sources to a plurality of remote locations within a building.

Still another object of the invention is to provide a system and method for controlling a plurality of electronic entertainment devices by means of a single coaxial cable.

Yet another object of the invention is to provide a system and method for controlling a plurality of electronic devices at respective remote locations in which a plurality of remote signal detectors are electrically powered from a central location.

A further object of the invention is to provide a system and method for controlling a plurality of electronic entertainment devices, whereby the respective signals from the entertainment devices are available substantially simultaneously at a plurality of remote locations.

SUMMARY OF THE INVENTION

These and other objects are accomplished in accordance with the present invention wherein a system for controlling the operation of a plurality of electronic devices from a remote area is provided. Each of the remote areas has a signal receiver and at least one of the electronic devices being controlled has a light energy receiver ordinarily cooperable with a corresponding portable light energy transmitter for controlling the operation of the corresponding device. The corresponding transmitter will be beyond the range of the corresponding light energy receiver when the transmitter is in the remote area. The system is comprised of electrical conductor means for electrically coupling the electronic devices to the signal receivers, light energy detector means positioned at each of the remote areas for detecting respective light energy control signals generated by a corresponding transmitter and for converting the light energy control signals into corresponding electrical control signals, and control means electrically coupled in series between each of the detector means and the electronic devices for receiving the electrical control signals from each of the detector means.

The detector means is coupled to the conductor means for transmitting the control signals in both directions along the conductor means. The control means is electrically coupled to the electronic devices for receiving respective electrical signals therefrom. The control means includes means for combining the respective electrical signals from the electronic devices into corresponding mixed electrical signals at a relatively constant impedance and for transmitting the mixed electrical signals to the signal receivers at the remote area. Means is provided for converting the electrical control signals from each of the detector means into corresponding light energy control signals and for transmitting the light energy control signals to control the corresponding electronic devices. Means is further provided for generating a predetermined DC electrical signal and for transmitting the DC electrical signal to each remote area to provide operating power for the detector means at each remote area.

In one aspect of the invention the electrical conductor means is comprised of first electrical conductor whereby the electrical control signals are transmitted from each of the detector means to the control means and a second electrical conductor for supplying the DC electrical signal from the control means to each of the detector means. In one embodiment the second electrical conductor electrically interconnects the control means to each of the signal receivers in series and the system further includes AC signal blocking means coupled between the second electrical conductor and each of the detector means for blocking the mixed electrical signals from being transmitted to each of the detector means and DC signal blocking means coupled between the second electrical conductor and each of the signal receivers for blocking DC electrical signals from being transmitted to each of the signal receivers. The second electrical conductor serves as a common conductor for carrying the mixed electrical signals and the DC electrical signal.

In another aspect of the invention first circuit means is coupled between the second electrical conductor and each of the detector means for feeding the DC electrical signal to operate the corresponding detector means and for allowing the DC electrical signal to continue on the second electrical conductor to the next successive remote area in series. In another embodiment the system further includes second circuit means coupled between the second electrical conductor and each of the signal receivers for feeding the mixed electrical signals from the second electrical conductor to the corresponding signal receiver and for allowing the mixed electrical signals to continue on the second electrical conductor to the next successive remote area in series.

In the preferred embodiment the second circuit means includes a two-way splitter circuit for feeding the mixed electrical signals to the corresponding signal receiver and for allowing the mixed electrical signals to continue along the second electrical conductor to the next successive remote area in series. The first and second electrical conductors are preferrably disposed in substantially parallel relationship within a single coaxial cable. The cable further includes a common electrical ground conductor and insulative material disposed between the first electrical conductor and between the ground conductor and the second electrical conductor to substantially isolate the first electrical conductor from the second electrical conductor.

BRIEF DESCRIPTION OF THE DRAWINGS

Other objects and advantages of the invention will be apparent from the detailed description and claims when read in conjunction with the accompanying drawings wherein:

DETAILED DESCRIPTION OF THE PREFERRED EMBODIMENT

In the description which follows, like parts are marked throughout the specification and drawings, respectively. The drawings are not necessarily to scale and in some instances proportions have been exaggerated in order to more clearly depict certain features of the invention.

Figure 1:
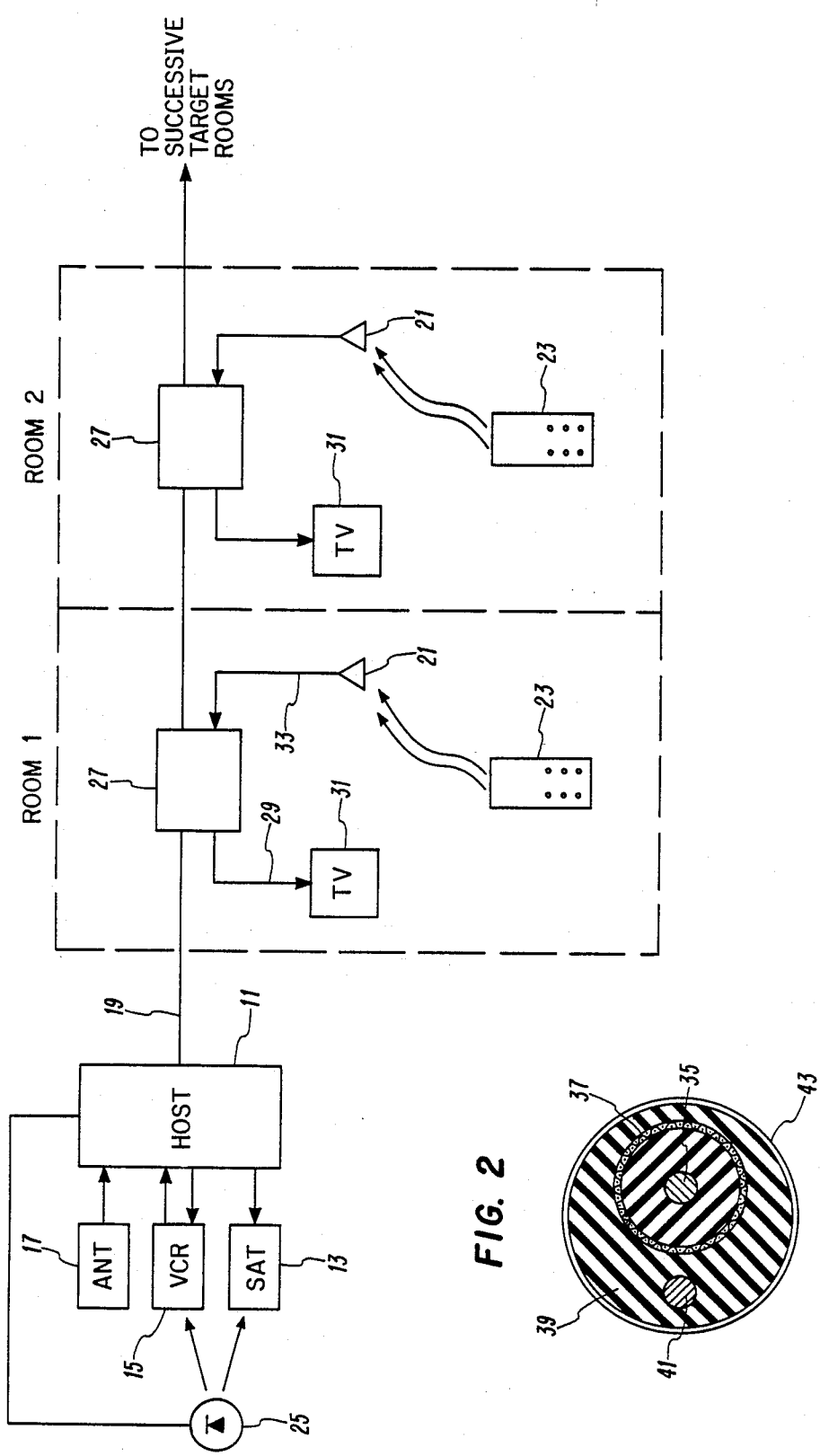
FIG. 1 is a block diagram of a system for controlling a plurality of entertainment devices from a plurality of remote locations, according to the present invention.
Figure 2:
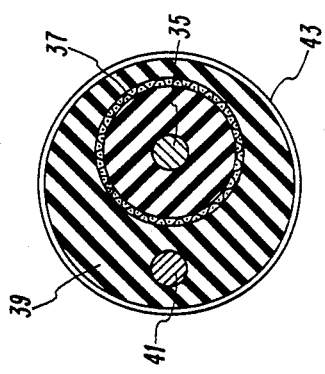
FIG. 2 is a sectional view of the coaxial cable used to connect the host controller unit with a plurality of remote locations in accordance with the present invention.

Referring to FIG. 1, a system for controlling a plurality of electronic devices from a remote location is depicted in accordance with the present invention. The heart of the system is a host controller 11, which is electrically coupled to a plurality of electronic devices, such as a satellite receiver unit (SAT) 13, video cassette recorder (VCR) 15 and rooftop antenna (ANT) 17. The radio frequency (RF) entertainment signals from SAT 13 and ANT 17 are fed into the system via host controller 11, whereupon the entertainment signals are transmitted to the remote locations (e.g., Rooms 1 and 2) on a single coaxial cable 19. When VCR 15 is being used to receive programs, the program signals are fed through host controller 11 into VCR 15. Similarly, the output of VCR 15 is fed into the system through host controller 11. SAT 13 and VCR 15 each have associated therewith an infrared receiver for detecting and decoding infrared control signals from a remote transmitter unit.

In accordance with the present invention a user can remotely control a plurality of electronic devices outside of the normal operational range of the conventional infrared receivers associated with such electronic devices. Each remote location, such as Target Rooms 1 and 2, is equipped with an infrared detector 21, which is preferably mounted in a non-conspicuous place in or on the wall within the particular room. A remote control transmitter 23 associated with the particular electronic device which is to be controlled is used to transmit the control signals in the direction of detector 21. For purposes of illustration the system will be described with reference to an infrared transmitter and receiver system. One skilled in the art will appreciate that the invention is not limited to the use of an infrared transmitter and receiver, but that any suitable remote control system could be used.

Detector 21 converts the infrared control signals to electrical signals and transmits the electrical control signals back to host controller 11 via cable 19. Host controller 11 includes a light-emitting diode 25 within normal operational range of the electronic devices which are being controlled. Host controller 11 reconverts the electrical control signals to infrared signals and transmits the infrared control signals via light-emitting diode 25 to the particular electronic device which is being controlled. Host controller 11 and the electronic devices being controlled, such as SAT 13 and VCR 15, are preferably housed in a central location, such as an entertainment closet or the like so that light-emitting diode 25 is in line-of-sight range with respect to SAT 13 and VCR 15. The entertainment closet referred to above can be an actual closet, an entertainment rack cabinet or a recessed area of a room so that the electronic devices are not readily visible. Cable 19 extends from the entertainment closet where host controller 11 is located to the farthest removed target room to provide a distributive two-way communications link between host controller 11 and each target room. One skilled in the art will appreciate that host controller 11 can be located anywhere along cable 19 (i.e., on either end or at any location in between).

Each target room further includes a conduit wall box 27 through which cable 19 runs. The entertainment signals feeding each target room are tapped off of cable 19 within wall box 27 and are transmitted via electrical conductor 29 to a television monitor 31 located in the corresponding target room. Similarly, the electrical signals from detector 21 are transmitted via electrical conductor 33 back to wallbox 27 wherein the control signals are fed onto cable 19 for being transmitted back to host controller 11.

All of the entertainment signals from SAT 13, VCR 15 and ANT 17 are fed through host controller 11 onto cable 19. If, for example, someone in Target Room 1 wants to watch a cable television program, he must first set the television monitor 31 to the proper channel for receiving cable (i.e., usually channel 3). He will then aim the particular remote control transmitter 23 which is used to control SAT 13 directly at the detector 21 mounted on the wall in Room 1 and press the appropriate buttons on transmitter 23 to send the proper control signal to select the satellite channel for display on television monitor 31. In similar fashion television monitor 31 can be set to receive entertainment signals from VCR 15 or ANT 17 by operating the appropriate transmitter 23 and setting television monitor 31 to the proper channel (i.e., usually channel 4 for VCR programs) and other channels as required for programs from ANT 17. A dedicated transmitter 23 may be used for each of the electronic devices or, alternatively, a single transmitter 23 having the capability to control all of the devices can be used.

In one aspect of the invention entertainment signals from more than one entertainment device can be transmitted along cable 19 so that users in different Target Rooms can simultaneously watch different television programs. For example, if someone in Room 1 is watching a satellite channel, another person in Room 2 can watch a VCR program by setting television monitor 31 in Room 2 to the VCR channel (i.e., channel 4) and using the appropriate transmitter 23 which controls VCR 15. Similarly, a third person in a third Target Room could simultaneously watch a television program from ANT 17 by setting the corresponding television monitor 31 to the proper channel for receiving rooftop antenna signals.

Referring to FIG. 1, another aspect of the invention is illustrated. Cable 19 is preferably a coaxial cable of the RG-59/u type, sold by Beldon Cable under Part No. 9276. Cable 19 includes a central conductor 35 on which the RF entertainment signals are transmitted and a coaxial shield (ground) conductor 37 which is concentrically disposed around central conductor 35. Insulative material 39 is disposed between central conductor 35 and ground conductor 37. In accordance with the present invention an additional conductor 41 is disposed within cable 19 for transmitting the control signals from the remote target rooms back to host controller 11. Conductor 41 shares a common ground conductor 37 with central conductor 35. Insulative material 39 is disposed between ground conductor 35 and ground conductor 37 and between ground conductor 37 and conductor 41. In this configuration the control signals and entertainment signals are transmitted over common cable 19 without RF interference. Furthermore, cable 19 includes a plastic outer jacket 43, which houses the aforementioned electrical components and insulative material. The need for installation of electrical conduits due to low voltage application is therefore eliminated, which substantially simplifies system connections and substantially reduces the cost of the system.

Figure 3:
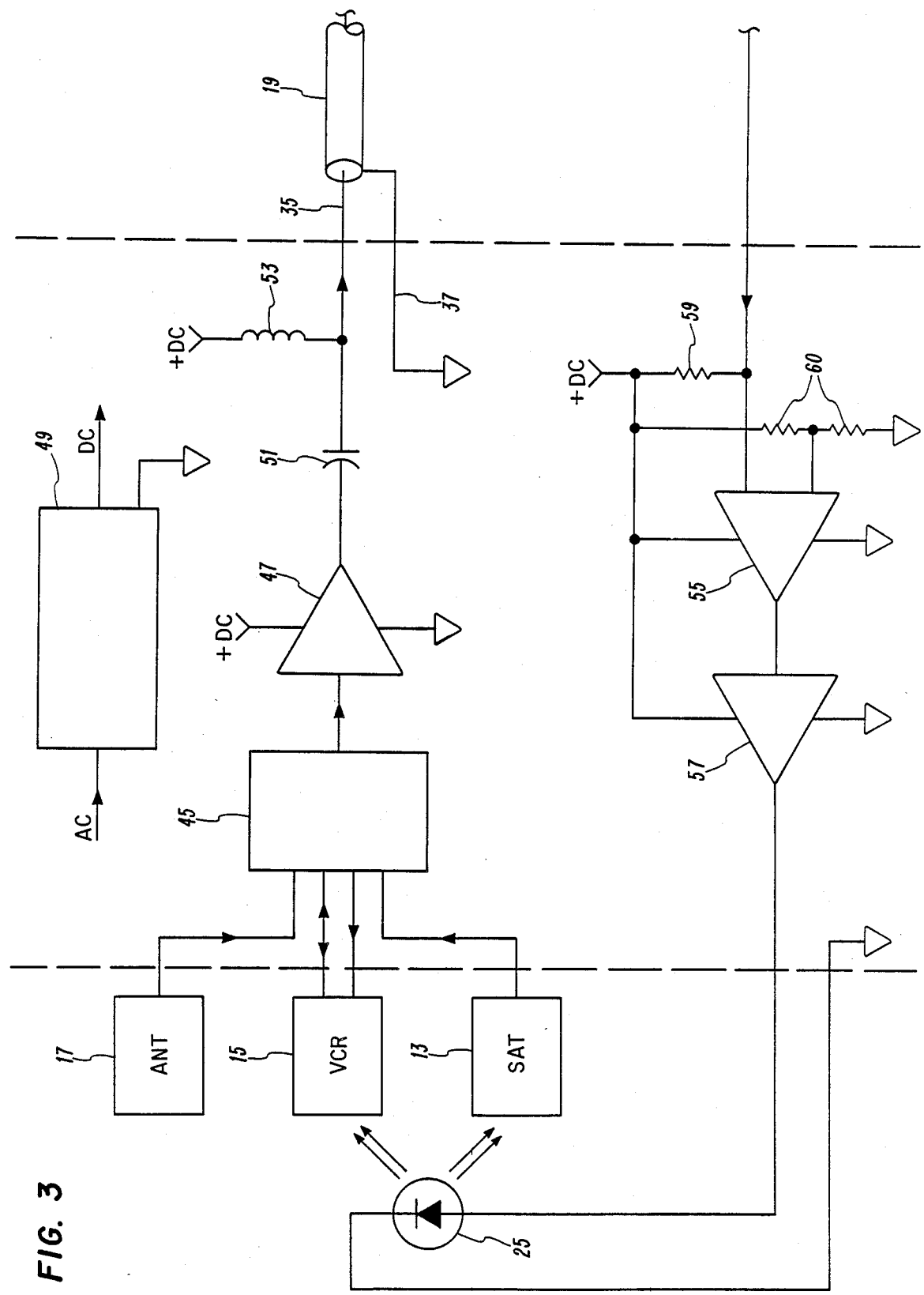
FIG. 3 is a circuit diagram of the host controller, according to the present invention.

Referring to FIG. 3, the electronic circuitry comprising host controller 11 is shown in detail. The entertainment signals from SAT 13, VCR 15 and ANT 17 are fed into a three-way combiner 45. Combiner 45 is comprised of a pair of two-way combiner circuits for mixing the signals from the three electronic devices to provide a combined output signal at a relatively constant 75 ohm impedance. VCR 15 can also record programs from either SAT 13 or ANT 17 by routing the entertainment signal through combiner 45, thereby eliminating the need for frequency spitters and additional cable connections which are usually required in conventional systems. Combiner 45 is preferably of the type manufactured and sold by Mini-Circuits, Inc. of Brooklyn, New York under part number PSC-2-1-75.

The output signal of combiner 45 is amplified by an RF booster amplifier 47, which is preferably an amplifier of the MC 5800 type, manufactured and sold by NEC Corporation. An AC to DC power supply converter 49 is provided for converting standard 120 volt AC power to 12 volt DC power to operate target room detectors 21. Power supply converter 49 is preferably a wall plug-in unit, manufactured and sold by Ault Corporation under part number 7312-000-400. The DC output from power supply converter 49 is fed onto central conductor 35 of cable 19 as a substantially steady-state DC signal, along with the RF entertainment signals, which are AC signals. A capacitor 51 is provided for preventing the DC signal from flowing back toward combiner 45 and an inductor 53 is provided for blocking the AC entertainment signals from flowing back toward power supply converter 49.

The control signals from the respective detectors 21 in the remote target rooms are transmitted back to host controller 11 via conductor 41. A voltage comparator 55 amplifies the DC control signals on conductor 41 and sends an output signal to a driver 57, which drives light-emitting diode(s) 25. Voltage comparator 55 is preferably of the LM 311 type, manufactured and sold by National Semiconductor Corporation. Driver 57 is preferably of the 2N914 type, manufactured and sold by Motorola Corporation. Light-emitting diode 25 may be any suitable device which converts an electrical excitation signal to an infrared radiation signal, such as the light-emitting diode sold by Texas Instruments Incorporated under part number TIL38.

A pull-up resistor 59 provides DC voltage to comparator 55 in the event of an "open collector" condition, which occurs when none of the target room detectors 21 is receiving control signals. Bias divider 60 is provided to set the detector threshold voltage on comparator 55 so that comparator 55 responds only to valid control signals and not to spurious noise on the line.

Figure 4:
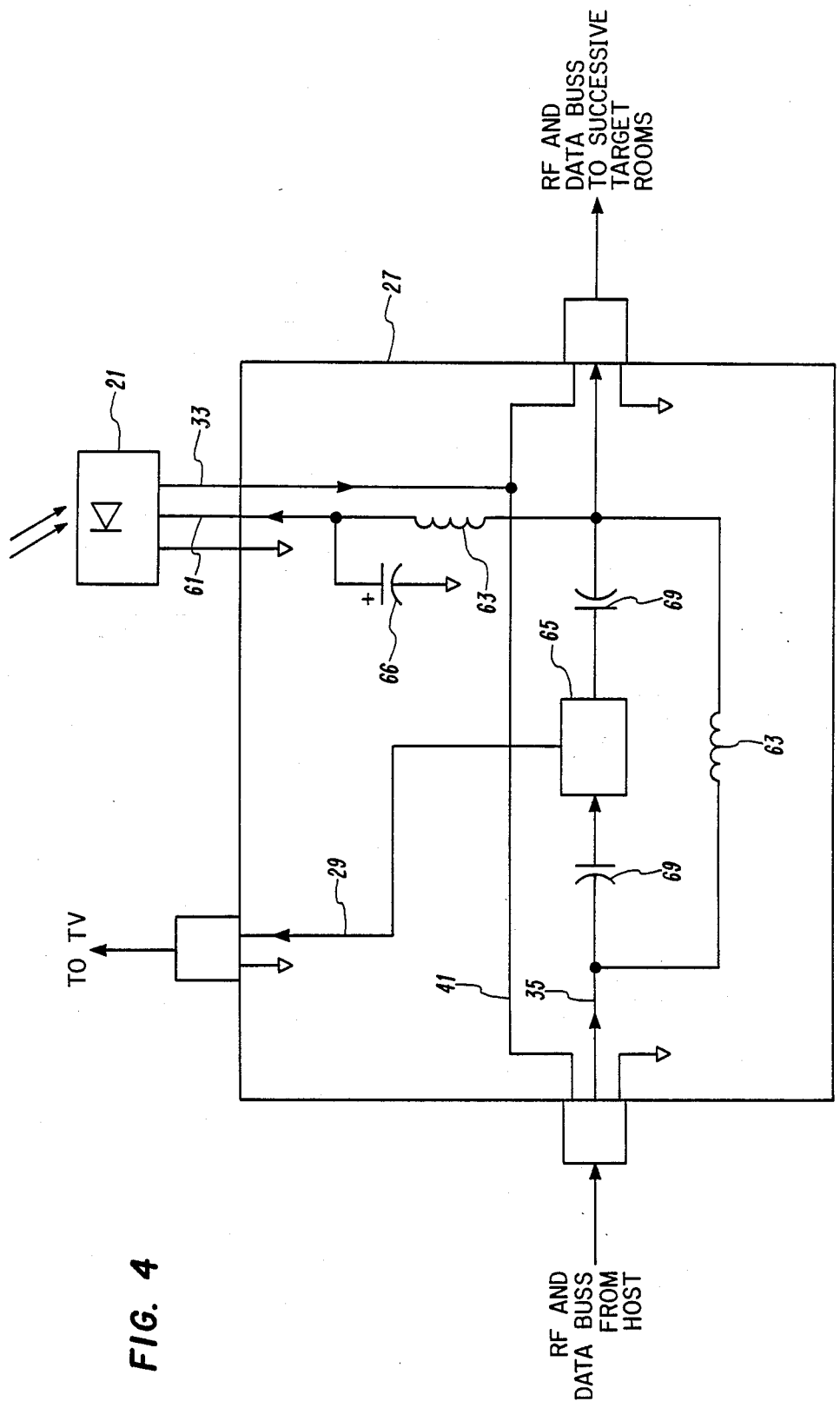
FIG. 4 is a circuit diagram of a conduit wall box installed at each remote location in accordance with the present invention.

Referring to FIG. 4, the electronic circuitry comprising wall box 27 is shown in greater detail. The wall-mounted detector 21 is powered by means of the 12 volt DC signal which is transmitted on central conductor 35 from power supply converter 49 in host controller 11. This DC signal is transmitted to detector 21 via conductor 61. When detector 21 detects the infrared control signals from transmitter 23, the incoming infrared signals are converted to electrical signals and transmitted via conductor 33 to conductor 41. The electrical control signals are in the form of DC coded pulses, such that conductor 41 functions as a pulse code data buss extending between host controller 11 and each of the remote target rooms. A pair of inductors 63 are provided for preventing the AC entertainment signals from reaching detector 21. Conductor 61 branches off of central conductor 35 in front of a two-way power splitter circuit 65 and taps back into central conductor 35 on the other side of splitter circuit 65, to allow the DC power supply signal to bypass power splitter circuit 65 and continue to successive target rooms. A filter capacitor 66 is connected to conductor 61 to shunt any AC component which is not blocked by inductors 63 to ground. Splitter circuit 65 routes the Ac entertainment signals transmitted on central conductor 35 to television monitor 31 in the particular target room via conductor 29. Two-way splitter circuit 65 is preferably of the type manufactured and sold by Mini-Circuits, Inc. of Brooklyn, New York. A pair of capacitors 69 are disposed on either side of splitter 65 to block the DC signal used to power detectors 21 from being transmitted to splitter 65. In addition to feeding entertainment signals to television monitor 31, splitter 65 allows the entertainment signals to continue on central conductor 35 to the next successive target rooms and cooperates with the corresponding splitters 65 in the other target rooms to maintain a substantially constant 75 ohm impedance entertainment signal.

One skilled in the art will appreciate that all of the infrared detectors 21 in the respective target rooms are powered directly from host controller 11 by transmitting DC power along with the AC entertainment signals on central conductor 35. In this manner, the need for expensive and unsightly wall transformers in each of the target rooms is eliminated because detectors 21 are powered directly from the respective wall boxes 27, which in turn receive power from host 11.

Figure 5:
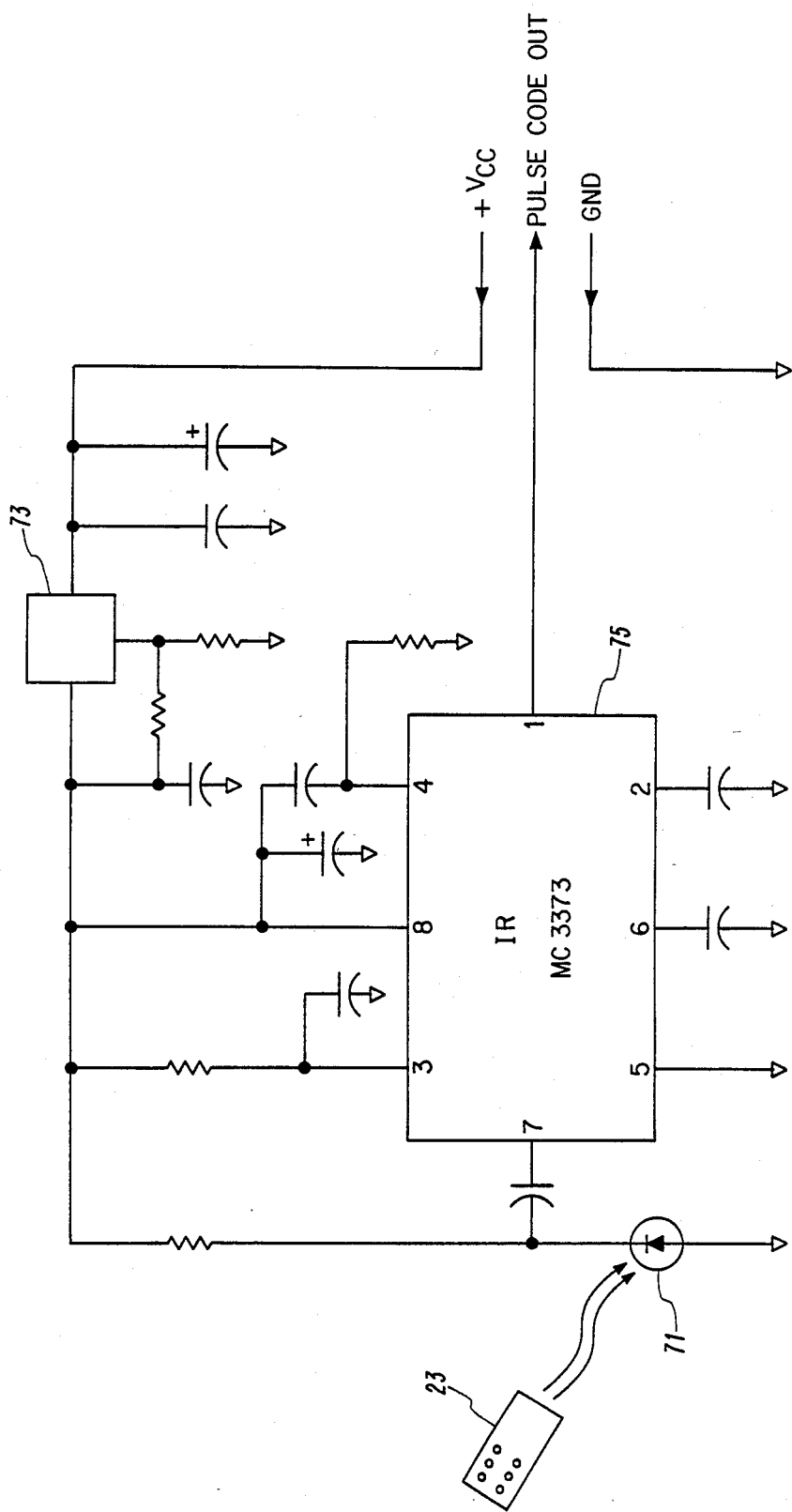
FIG. 5 is a circuit diagram of an infrared detector device installed at each of the remote locations in accordance with the present invention.

Referring to FIG. 5, the electronic circuitry comprising each infrared detector 21 is depicted in greater detail. Each detector 21 includes an infrared photodiode 71, which receives the infrared control signals from transmitter 23 and converts the infrared signals to corresponding electrical signals. Photodiode 71 is preferably of the type manufactured and sold by Texas Instruments Incorporated under part number TIL 100. A voltage regulator 73 reduces the voltage of the incoming DC signal from wall box 27 from approximately 12 volts DC to approximately 8 volts DC. An infrared receiver/amplifier 75 includes pulse coding circuitry for converting the electrical signals generated by photodiode 71 to coded DC data pulses, which are transmitted back to pulse code data buss 41 via wall box 27. The DC signals used to control the various electronic devices connected to host controller 11 are discretely coded so that host controller 11 is able to discriminate among the control signals for the various devices and selectively operate the devices in accordance with the proper set of control signals. The control signals generated by photodiode 71 are transmitted to receiver/amplifier 75 on pin 7. DC power is applied on pin 8. The RC circuit connected to pin 3 tunes receiver/amplifier 75 to the proper frequency to match transmitter 23. Gain control is provided on pin 6 and peak hold circuitry is coupled to pin 4.

The system and method for controlling a plurality of electronic devices according to the present invention allows a user to control the distribution of entertainment signals from a plurality of entertainment sources to a plurality of remote locations within a building. Both the AC entertainment signals and the DC control signals are transmitted along a single coaxial cable, thereby eliminating the need for frequency splitters and other isolation circuitry required in prior art systems. Each of the infrared detectors in the remote target rooms is powered directly from the host controller, thereby eliminating the need for wall transformers and the like in each of the target rooms. The respective entertainment signals from a plurality of entertainment devices, such as satellite receiver unit, video cassette recorder and rooftop antenna, are available substantially simultaneously at respective remote target rooms, so that "time sharing" of entertainment events is not required.

Various embodiments of the invention have been described in detail. Since changes in and modifications to the above-described preferred embodiment may be made without departing from the nature, spirit and scope of the invention, the invention is not to be limited to said details, except as set forth in the appended claims.

What is claimed is:

1. A system for controlling the operation of a plurality of electronic devices from a plurality of remote areas, each of said remote areas having a signal receiver, at least one of said electronic devices having a light energy receiver ordinarily cooperable with a corresponding portable light energy transmitter for controlling the operation of the corresponding device, said corresponding transmitter when in said remote area being beyond the range of the corresponding receiver, said system comprising:

electrical conductor means for electrically coupling said electronic devices to said signal receivers;

light energy detector means positioned at each of said remote areas for detecting respective light energy control signals generated by a corresponding transmitter and for converting said light energy control signals into corresponding electrical control signals, said detector means being coupled to said conductor means for transmitting said control signals in both directions along said conductor means; and control means electrically coupled in series between each of said detector means and said electronic devices for receiving said electrical control signals from each of said detector means, said control means being electrically coupled to said electronic devices for receiving respective electrical signals therefrom, said control means having:

means for combining the respective electrical signals from said electronic devices into corresponding mixed electrical signals at a relatively constant impedance and for transmitting said mixed electrical signals to said signal receivers, means for converting the electrical control signals from each of said detector means into corresponding light energy control signals and for transmitting the corresponding light energy signals to control the corresponding electronic devices, and means for generating a predetermined DC electrical signal and for transmitting said DC electrical signal to each remote area to provide operating power for the detector means at each remote area.

2. The system according to claim 1 wherein said electrical conductor means is comprised of a first electrical conductor whereby said electrical control signals are transmitted from each of said detector means to said control means and a second electrical conductor for supplying said DC electrical signal from said control means to each of said detector means.

3. The system according to claim 2 wherein said second electrical conductor electrically interconnects said control means to each of said signal receivers in series, said system further including AC signal blocking means coupled between said second electrical conductor and each of said detector means for blocking said mixed electrical signals from being transmitted to each of said detector means and DC signal blocking means coupled between said second electrical conductor and each of said signal receivers for blocking DC electrical signals from being transmitted to each of said signal receivers, said second electrical conductor serving as a common conductor for carrying said mixed electrical signals and said DC electrical signal.

4. The system according to claim 3 further including first circuit means coupled between said second electrical conductor and each of said detector means for feeding said DC electrical signal to operate the corresponding detector means and for allowing said DC electrical signal to continue on said second electrical conductor to the next successive remote area in series.

5. The system according to claim 4 further including second circuit means coupled between said second electrical conductor and each of said signal receivers for feeding said mixed electrical signals from said second electrical conductor to the corresponding signal receiver and for allowing said mixed electrical signals to continue on said second electrical conductor to the next successive remote area in series.

6. The system according to claim 5 wherein said second circuit means includes a two-way splitter circuit for feeding the mixed electrical signals to the corresponding signal receiver and for allowing the mixed electrical receivers to continue along said second electrical conductor to the next successive remote area in series.

7. The system according to claim 5 wherein said first and second electrical conductors are disposed in substantially parallel relationship within a single coaxial cable, said cable further including a common electrical ground conductor and insulative material disposed between said first electrical conductor and said ground conductor and between said ground conductor and said second electrical conductor to substantially isolate said first electrical conductor from said second electrical conductor.

* * * * *